United States Patent [19]
Decreamer

[11] Patent Number: 5,804,929
[45] Date of Patent: Sep. 8, 1998

[54] PICTURE DISPLAY DEVICE PROVIDED WITH A CATHODE RAY TUBE

[75] Inventor: Alain Decreamer, Garches, France

[73] Assignee: U.S. Philips Corporation, New York, N.Y.

[21] Appl. No.: 762,623

[22] Filed: Dec. 9, 1996

[30] Foreign Application Priority Data

Dec. 20, 1995 [FR] France .................................. 95 15176

[51] Int. Cl.$^6$ .................................................. H01J 29/70
[52] U.S. Cl. .............................. 315/411; 348/730; 363/21
[58] Field of Search ............................ 315/411; 348/730; 363/21

[56] References Cited

U.S. PATENT DOCUMENTS 5,034,667  7/1991  Lendaro .................................. 315/411
5,270,823  12/1993  Heidebroek et al. .................... 315/411
5,291,386  3/1994  Wu ............................................ 363/21

OTHER PUBLICATIONS

"Source book of Electronic Circuits" by John Markus, MacGraw–Hill Editions, 1968, p. 594.

*Primary Examiner*—Theodore M. Blum
*Attorney, Agent, or Firm*—Edward W. Goodman

[57] ABSTRACT

The control performance of a controlled power supply (14, 13, 1, 6, 8) which specifically feeds the line output stage (35) is deliberately degraded so as to produce the same effect as in the case where a resistor of about ten ohms would be arranged in its power supply connection (5). This is realized by causing the current feeding the line output stage (35) to flow through a part of a resistor (8) of the divider.

2 Claims, 2 Drawing Sheets

PICTURE DISPLAY DEVICE PROVIDED WITH A CATHODE RAY TUBE

BACKGROUND OF THE INVENTION

1. Field of the Invention

The invention relates to a picture display device provided with a cathode ray tube having a screen and comprising a line output stage for generating a current for the horizontal deflection of the cathode beam, and an "extra high tension" (EHT) voltage required for the screen of the tube, a power supply module intended for supplying power to the line output stage, and for supplying a controllable voltage having a value which is controlled by a control value, and an arrangement for generating said control value comprising a comparator having a first input connected to a reference voltage source and a second input for receiving a fraction of said controllable voltage, said controllable voltage fraction being formed by means of a resistive divider consisting of a first branch connected between the power supply module and the second input of the comparator, and a second branch, connected between the second input of the comparator and a reference voltage.

2. Description of the Related Art

A controlled power supply with a limitation of the current, entitled "Overload protection for series regulator" is described on page 594 of "Source Book of Electronic Circuits" by John Markus, MacGraw-Hill Editions, 1968. This power supply has a current limitation which is realized by a circuit which is different from the voltage control circuit and becomes only active from a predetermined current threshold.

A particular problem occurs in television apparatuses. The following effect, well known to those skilled in the art, arises: if a user increases the luminance of the picture displayed on the screen by means of the available control facilities, the beam current of the display tube will increase, which will result in a drop of the extra high tension (EIT) because of the internal resistance of the EHT generator, and the decrease of the extra high tension involves an enlargement of the displayed image. To counterbalance this effect, it is common practice to introduce a resistor, usually having a value of some ten ohms, in series with the power supply connection of the line output stage. The following effect is caused by this resistor: if the current drawn by the extra high tension increases because of the increase of the beam current for the display tube, the current consumed by the EHT generator also increases, and since the same circuit generates both the line scan and the extra high tension, it is eventually the current of the line output stage which increases, with the result that, due to the resistance of about ten ohms, the power supply voltage of the line output stage decreases and consequently the scanning amplitude also decreases, which counterbalances the enlargement of the picture due to the decrease of the extra high tension.

SUMMARY OF THE INVENTION

It is an object of the invention to suppress the resistance of about ten ohms because it permanently dissipates a non-negligible power.

To this end, the line output stage is connected to a terminal of said resistive divider in such a way that the power supply current for the line output stage flows through a part of the divider.

The invention is thus based on the idea of deliberately degrading the control performance of the device producing the power supply voltage for the line output stage so as to produce the same effect as in the case where a resistor of about ten ohms would be arranged in the power supply connection. Although it produces the same effect as the ten-ohm resistor of the prior art, the part of the resistive divider which is traversed by the power supply current for the line output stage has a value of only a fraction of one ohm, which provides an economy of power.

In a preferred embodiment, the part of the resistive divider traversed by the power supply current for the line output stage forms part of the first branch of the divider, and the reference voltage source is connected between the output of the power supply module supplying a controllable voltage and the first input of the comparator.

These and other aspects of the invention will be apparent from and elucidated with reference to the embodiments described hereinafter.

DESCRIPTION OF THE PREFERRED EMBODIMENTS

The invention will be described with reference to a television apparatus, but it is also applicable to any other picture display device, for example, a monitor.

Figure 1:
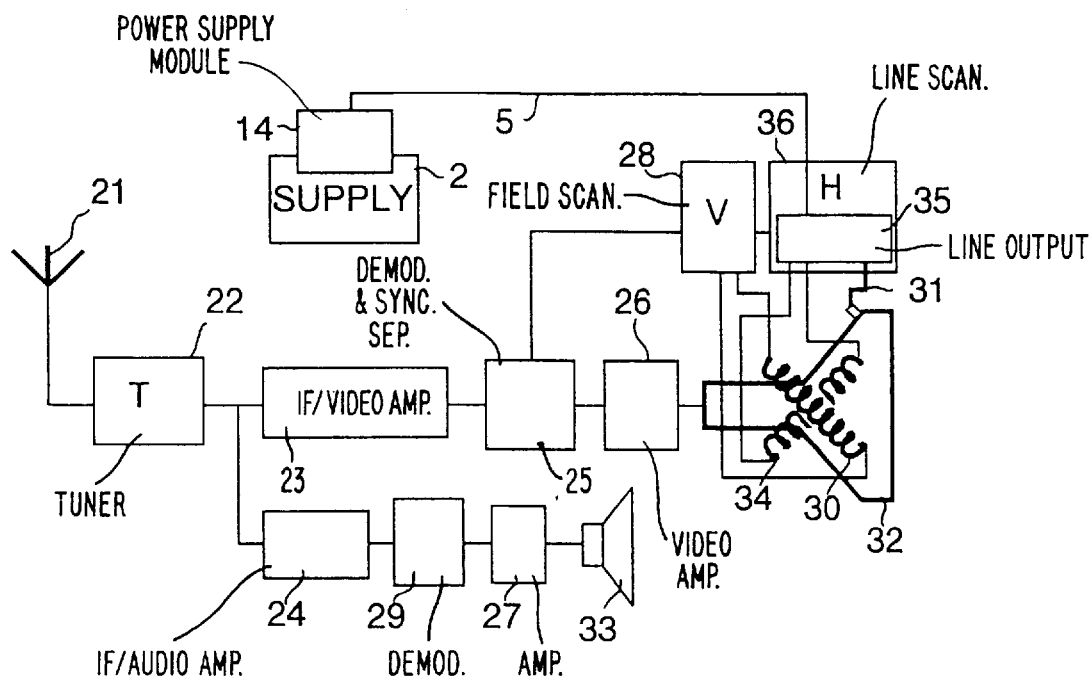
FIG. 1 shows, diagrammatically a picture display apparatus provided with a cathode ray tube.

The television apparatus, which is shown in a diagram in FIG. 1, comprises a tuner 22 receiving a signal, for example, from an antenna 21 and transposing its frequency to intermediate frequencies intended for a subsequent IF video amplifier 23 and an IF audio amplifier 24. The IF audio amplifier 24 is followed by a demodulator 29 which supplies the audio signals in the baseband to an audio output amplifier 27 feeding a loudspeaker 33. The IF video amplifier 23 is followed by a unit 25 which supplies a video signal in the baseband to a video amplifier 26 supplying the signals ad hoc to the electrodes of a cathode ray tube 32. The unit 25 also extracts, from the signal, synchronizing signals which are applied to a field scanning circuit 28 and a line scanning circuit 36. The field scanning circuit 28 supplies a current in a field deflection coil 30. The line scanning circuit comprises a line output stage 35 which supplies a current in a line deflection coil 34 and generates a voltage, referred to as "extra high tension" (EHT), of approximately 25 kV for supplying power to the screen of the display tube via a connection 31. The line output stage 35 is fed via a connection 5 by means of a specific power supply module 14 which itself is fed by a general power supply unit 2 connected to the mains. As is common practice, the other circuits 22–29 are powered from the line output stage 35 through connections which, for the purpose of simplifying the Figure, are not shown.

Figure 2:
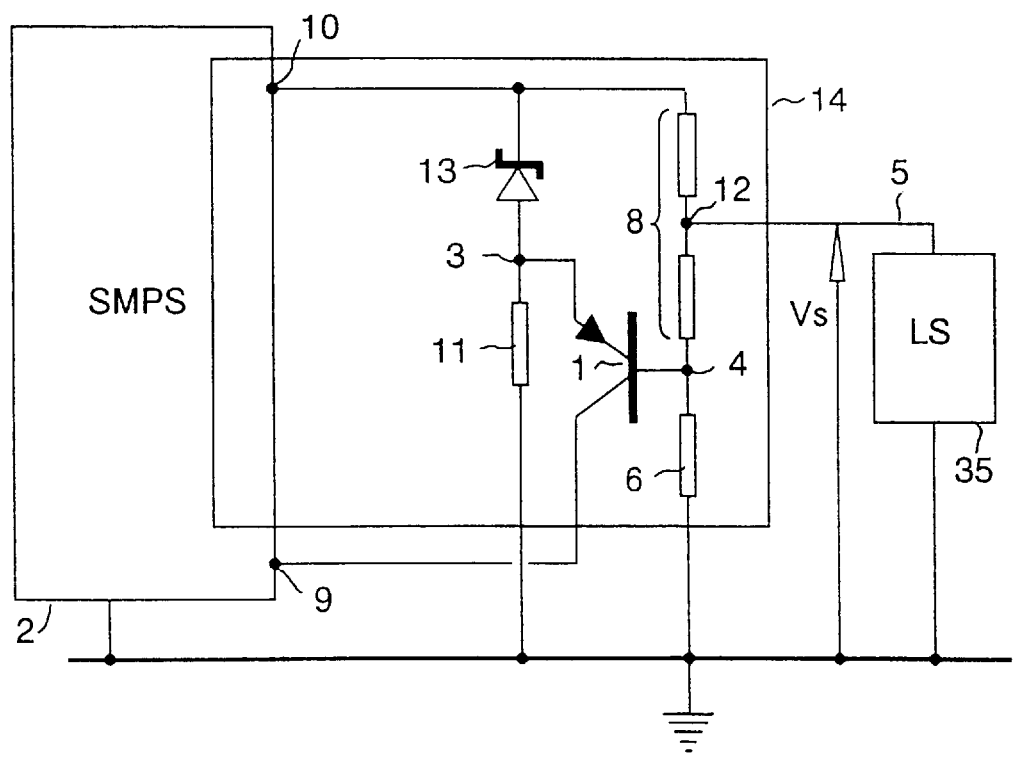
FIG. 2 shows, diagrammatically a first embodiment of a device for producing a power supply voltage for a line output stage.

The device shown in FIG. 2 comprises:

a line output stage 35 which corresponds to that shown in FIG. 1 and is supplied, via the connection 5, with a voltage Vs between a terminal 12 and ground; and a power supply module 14 which is supplied with a general power supply unit 2 connected to the line voltage and corresponding to the elements denoted by the same reference numerals as in FIG. 1. The power supply unit 2 supplies a controllable power supply voltage, for example, a positive voltage, at a terminal 10 with respect to ground. The voltage is controlled by means of a control value applied to a control voltage input 9; the power supply unit 2 is, for example, a generator known as switched-mode power supply (SMPS), of which there are many variants known to those skilled in the art and all of which are controllable by means of a control value. However, any other type of known power supply may be used, provided that the voltage produced can be controlled by means of a control value, voltage or current.

In the power supply module 14, an arrangement for generating the control value essentially comprises:

a comparator, constituted, in this case, by a transistor 1 of, for example, the PNP type; its emitter constitutes the first input 3 of the comparator, its base constitutes the second input 4 of the comparator and its collector constitutes the output connected to the control voltage input 9; many other known comparator models may also be used, such as, inter alia, a differential pair;

a zener diode 13, which constitutes a reference voltage source, and is connected between the terminal 10 of the power supply module supplying a controllable voltage and the emitter of the transistor 1 constituting the first input 3 of the comparator; a resistor 11, connected between the zener diode and ground, allows passage of a current in the zener diode;

a divider bridge consisting of a first branch, referred to as "front-end" branch, which comprises the resistor 8 and is connected between the terminal 10 of the power supply module 14 and the second input 4 of the comparator, and a second branch, referred to as "rear-end" branch, which comprises the resistor 6 and is connected between the second input 4 of the comparator and a reference voltage, i.e., ground in this case. A fraction of the controllable voltage at the terminal 10 is then formed at the terminals of the series-arranged resistors 8 and 6 and is applied to the base of transistor 1.

The power supply connection 5 for the line output stage 35 is connected to a terminal 12 of the resistor 8. A part of this resistor 8 is thus traversed by the power supply current for the line output stage.

Figure 3:
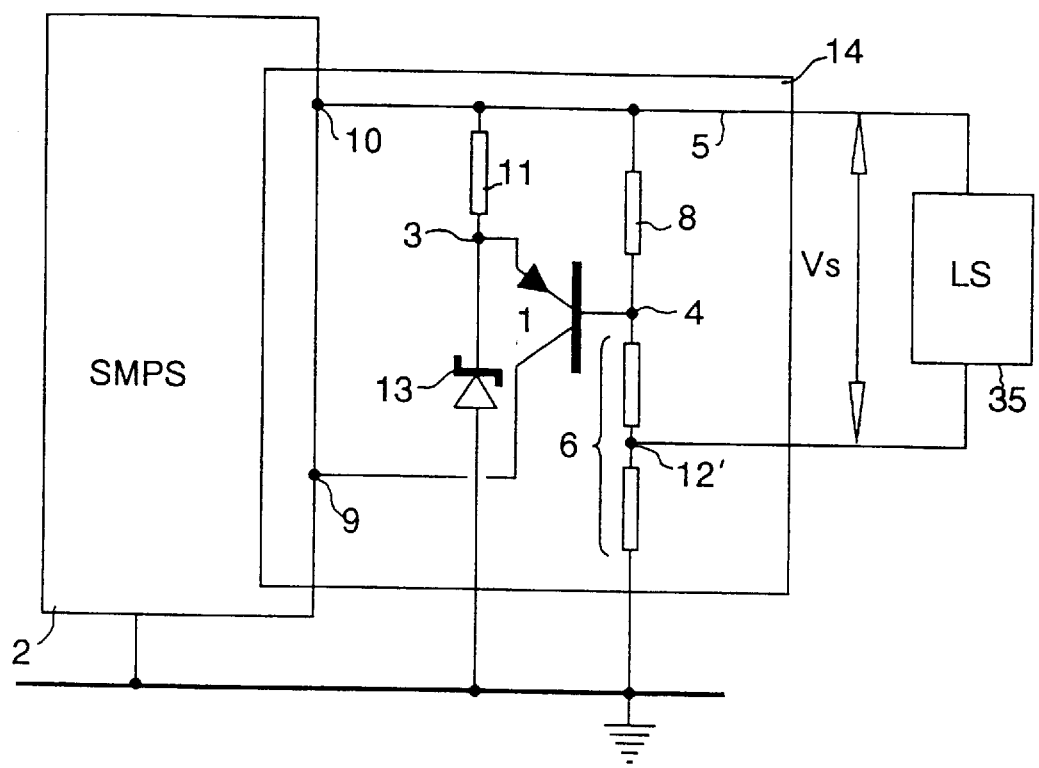
FIG. 3 shows diagrammatically a second embodiment of a device for producing a power supply voltage for a line output stage.

A similar device is shown in FIG. 3. In this device, the majority of the elements is identical to those shown in FIG. 2, particularly the power supply unit 2, the line output stage 35, the transistor 1, the first and the second input 3 and 4 of the comparator. The difference between the arrangements of FIGS. 2 and 3 is that the zener diode 13 is now connected between the point 3 and ground, and that the line output stage is connected at the positive side directly to the terminal 10 and to ground via a part of the resistor 6 by means of a terminal 12: Part of the resistor 6 is thus traversed by the power supply current for the line output stage. The resistor 11 allowing passage of a current in the zener diode is connected between the terminal 10 of the power supply module and the emitter of transistor 1.

The device shown in FIG. 2 is, however, preferred because the line output stage in this device is directly connected to ground.

The indication of several numerical values with reference to FIG. 2 will make it clear why the same effect is obtained as with a resistor of 10 ohms arranged in the power supply connection. The zener diode 13 is, for example, of the type "5V2" which provides a voltage of 5.2 volts. The voltage of the zener diode 13 in series with the emitter-base voltage of the transistor 1 provides approximately 6 volts. This voltage is also present across the resistor 8. If the voltage desired at the point 10 is, for example, 96 volts, it should thus be 6 volts at the terminals of the resistor 8, and 90 volts across the resistor 6. The voltage across the resistor 8 is, as it were, multiplied by the ratio between the resistors 6+8 and 8 because of the error voltage applied to the input 9 of the circuit 14. The voltage induced by the passage of the supply current for the line output stage in a part of the resistor 8 is also multiplied by the ratio between the resistors 6+8 and 8 and provides the same effect as a resistor of 10 ohms arranged in the power supply connection between the point 12 and the circuit 15, although the top part of the resistor 8 has a value of approximately 0.6 ohms, i.e., 10 ohms×6/96.

In, for example, a 110° display tube of average dimensions, a line output stage consumes approximately 700 mA at 96 V, which dissipates approximately five watts in a resistor of 10 ohms. These five watts are economized with the arrangement according to the invention.

I claim:

1. A picture display device provided with a cathode ray tube having a screen and comprising:

a line output stage for generating a current for the horizontal deflection of the cathode beam and an extra-high tension (EHT) voltage for the screen of the cathode ray tube;

a power supply module for providing power to the line output stage, said power supply module having a terminal for supplying a controllable voltage having a value which is controlled by a control value; and an arrangement for generating said control value, said arrangement comprising a comparator having a first input connected to a reference voltage source and a second input for receiving a fraction of said controllable voltage, said fraction of said controllable voltage being formed by a resistive divider having a first branch connected between said terminal of the power supply module carrying said controllable voltage and the second input of the comparator, and a second branch connected between the second input of the comparator and a reference voltage, characterized in that the line output stage is connected to a terminal of said resistive divider such that the power supply current for the line output stage flows through a part of said resistive divider.

2. A picture display device as claimed in claim 1, characterized in that the part of the resistive divider traversed by the power supply current for the line output stage forms part of the branch of the resistive divider, and the reference voltage source is connected between the terminal of the power supply module supplying the controllable voltage and the first input of the comparator.

\* \* \* \* \*